United States Patent
Burgess

(10) Patent No.: US 11,707,867 B1
(45) Date of Patent: Jul. 25, 2023

(54) SYSTEM FOR HANDLING USED PACKAGING FILM IN A FOOD PROCESSING FACILITY

(71) Applicant: Troy D Burgess, Lincoln, NE (US)

(72) Inventor: Troy D Burgess, Lincoln, NE (US)

(73) Assignee: CSR WORLDWIDE OK, INC., Watts, OK (US)

( * ) Notice: Subject to any disclaimer, the term of this patent is extended or adjusted under 35 U.S.C. 154(b) by 0 days.

(21) Appl. No.: 17/878,900

(22) Filed: Aug. 1, 2022

Related U.S. Application Data

(60) Provisional application No. 63/227,936, filed on Jul. 30, 2021.

(51) Int. Cl.
| | |
|---|---|
| B08B 3/08 | (2006.01) |
| A01N 33/12 | (2006.01) |
| A01P 1/00 | (2006.01) |
| A01N 25/30 | (2006.01) |
| B29B 17/00 | (2006.01) |
| B29B 17/04 | (2006.01) |
| B29B 9/06 | (2006.01) |
| B29K 105/26 | (2006.01) |
| B29K 23/00 | (2006.01) |

(52) U.S. Cl.
CPC .......... *B29B 17/0026* (2013.01); *A01N 25/30* (2013.01); *A01N 33/12* (2013.01); *A01P 1/00* (2021.08); *B08B 3/08* (2013.01); *B29B 9/06* (2013.01); *B29B 17/0412* (2013.01); *B29B 2017/0015* (2013.01); *B29K 2023/0633* (2013.01); *B29K 2105/26* (2013.01)

(58) Field of Classification Search
None
See application file for complete search history.

(56) References Cited

U.S. PATENT DOCUMENTS

| | | | |
|---|---|---|---|
| 2007/0020410 A1* | 1/2007 | Sasine | B65D 85/07 428/2 |
| 2015/0298360 A1* | 10/2015 | Fullana Font | B29B 17/02 241/20 |
| 2017/0268814 A1* | 9/2017 | Sigety | F25D 23/021 |
| 2022/0279821 A1* | 9/2022 | Bowden | A23B 7/04 |

FOREIGN PATENT DOCUMENTS

| | | | | |
|---|---|---|---|---|
| WO | WO-2004106025 A1 | * | 12/2004 | B29B 17/02 |
| WO | WO-2016156869 A2 | * | 10/2016 | A01N 25/32 |
| WO | WO-2022038630 A1 | * | 2/2022 | |

OTHER PUBLICATIONS

WO-2004106025 (Fredl) Dec. 2004 (online machine translation), [Retrieved on Oct. 21, 2022], Retrieved from: Espacenet (Year: 2004).*

* cited by examiner

*Primary Examiner* — Alison L Hindenlang
*Assistant Examiner* — Andrés E. Behrens, Jr.
(74) *Attorney, Agent, or Firm* — Plager Schack LLP; Mark H. Plager; Naomi Mann

(57) ABSTRACT

A system for handling used packaging film in a food processing facility is provided. The system stores the used film in a refrigerated truck trailer at the food processing facility to prevent rotting, prior to transporting the film to a treatment facility where the film may be recycled.

20 Claims, 2 Drawing Sheets

SYSTEM FOR HANDLING USED PACKAGING FILM IN A FOOD PROCESSING FACILITY

RELATED APPLICATION

This application claims benefit to U.S. Provisional Application No. 63/227,936 filed Jul. 30, 2021, which is incorporated by reference herein in its entirety.

BACKGROUND

The present invention generally relates to a system for the treatment of contaminated film used in packaging perishable food product.

Food packaging film, including plastic, protein, and/or LDPE film, may be useful in maintaining a sterile packaging environment and/or preventing the packaged food from leaking. However, once the packaged food is delivered to a food processing facility and unpackaged for further processing, the discarded film may become a breeding ground for microbes/pathogens, presenting a serious contamination hazard for the food processing facility. As such, there is a need for an improved systems for the treatment of the used film.

SUMMARY

According to various embodiments, a method for handling used packaging film in a food processing facility may comprise storing the used packaging film in a refrigerated unit at the food processing facility for a multiple number of days; and transporting the used packaging film to a treatment facility for treatment following the multiple number of days, wherein the used packaging film is contaminated with perishable food residue, and wherein the mobile refrigerated unit retards pathogenic growth in the used packaging film.

In certain embodiments, the refrigerated unit may be a mobile unit which is also used to transport the film. In some embodiments, the mobile refrigerated unit is a reefer trailer. In certain embodiments, the mobile refrigerated unit includes a roll up door. In further embodiments, the used packaging film is baled prior to storing in the mobile refrigerated unit. In some embodiments, multiple bales of the packaging film are stored within the mobile refrigerated unit for at least 7 days, prior to delivering to the treatment facility.

In certain embodiments, the used packaging film comprises plastic film, protein film, and/or LDPE film. In some embodiments, the used packaging film has been used for packaging raw meat items, including poultry. In certain embodiments, a temperature of the mobile refrigerated unit is no greater than about 2 degrees Celsius.

In further embodiments, the treatment method may comprise adding a deodorizing composition to the used packaging film. In some embodiments, the deodorizing composition is added to the used packaging film while it is stored in the mobile refrigerated unit. In some embodiments, the deodorizing composition is added to the used packaging film during treatment. In certain embodiments, the deodorizing composition comprises: an effective amount of an anti-fungal and/or anti-microbial agent; an effective amount of a surfactant; an effective amount of a solvent; and an effective amount of a chelating agent. In some embodiments, the anti-fungal and/or anti-microbial agent comprises cAlkyl (C12-16) dimethyl benzyl ammonium chloride; and the surfactant comprises C12-15 alcohol ethoxylate.

In certain embodiments, treatment of the used packaging film comprises reclamation of the film. In some embodiments, treatment of the used packaging film comprises washing the film in a high Ph solution. In some embodiments, treatment of the used packaging film comprises grinding the film prior to washing in a high Ph solution. In certain embodiments, treatment of the used packaging film further comprises extruding the film after washing in said high Ph solution. In some embodiments, treatment of the used packaging film further comprises removal of any foreign remnants from the ground film prior to extruding. In some embodiments, treatment of the used packaging film further comprises densification of the ground film prior to extruding.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

In the following detailed description of the invention, numerous details, examples, and embodiments of the invention are described. However, it will be clear and apparent to one skilled in the art that the invention is not limited to the embodiments set forth and that the invention can be adapted for any of several applications.

All illustrations of the drawings are for the purpose of describing selected versions of the present invention and are not intended to limit the scope of the present invention.

Food packaging film, including plastic film, protein film, and/or LDPE film may create a contamination hazard, which may violate FDA and/or USDA regulations if left untreated in a food processing facility. Typically, after removing the food from the packaging film, the film may be bundled up into bale(s) of film. However, the bale(s) of film are typically contaminated with residual food matter including without limitation cheese, eggs, raw meat such as poultry, and the like, which rapidly decompose and rot. For example, a bale of protein film used in packaging raw poultry will attract flies and maggots and create a noticeable putrid odor in about a day. Accordingly, such bale must be treated and/or disposed of immediately to prevent hazardous contamination according to FDA/USDA rules and regulations. While contaminated bale(s) may be transported from the food production facility for disposal or reclamation, transporting bale(s) on a daily basis may be economically unfeasible and/or unpractical. Furthermore, collecting the bales anywhere at the facility for a period of even a few days, including inside a dry truck, may create a contamination hazard and cause the facility to be non-compliant with FDA/USDA regulations. Conventional methods of handling the contaminated film may include incinerating the contaminated film at the facility. However, this process wastes the film material, which may otherwise be recycled, in addition to polluting the environment.

Figure 1:
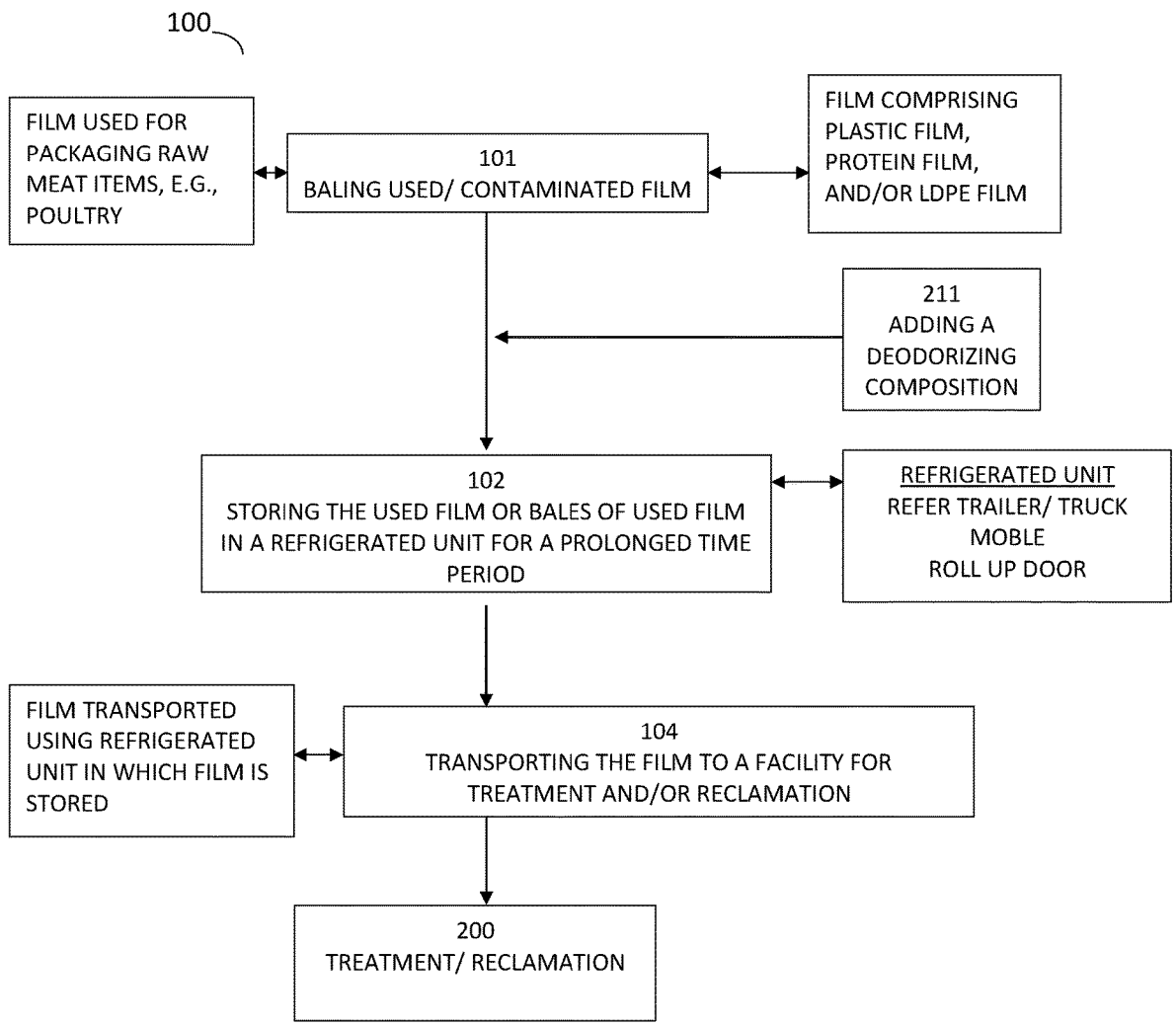
FIG. 1 is a flow chart for a method of handling used film.
Figure 2:
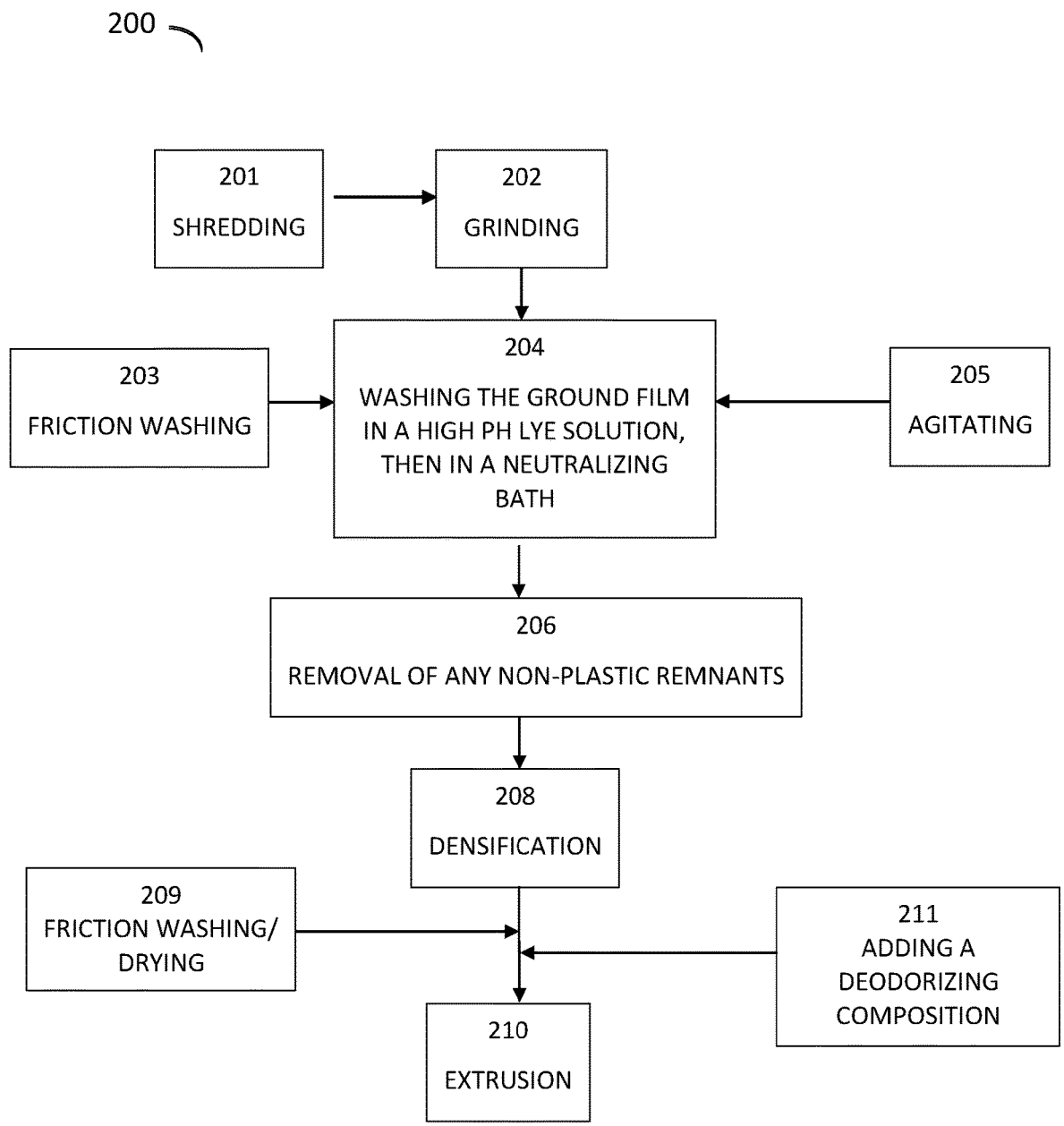
FIG. 2 is a flow chart for a treatment and/or reclamation process of the used film.

With reference to FIG. 1, disclosed is a method 100 for handling used film comprising storing the used film, or bales of the used film, for a prolonged time period in a refrigerated unit, which may be a mobile unit such as a truck trailer (also known as a "reefer") (step 102). In further embodiments, the stored film may be transported for treatment/reclamation after the prolonged storage period (step 104). In certain embodiments, the film is stored at the food processing facility. The cooled storage system prevents the bales from rotting and keeps the facility compliant with FDA/USDA regulations. This allows a large amount of film to be collected over a prolong period, until it is economically reasonable to transport the film to a facility for treatment and/or reclamation. In one embodiment, the film may be stored until the reefer unit is substantially full and/or where cost of transporting would be economically reasonable based on the amount of film and/or reclamation profits. In certain embodiments, the film may be bundled in bales (step 101) for compact, organized storage. The low storage temperature of the reefer unit allows multiple bales to be collected over multiple days or weeks, such that they may be transported in a single trip to the treatment/recycling facility, instead of daily. In certain embodiments, a reefer unit used in delivering the packaged food to the facility may also be used for collecting and delivering the bales to the treatment facility.

In one example, a poultry facility may receive 50-60 boxes of packaged poultry from a slaughterhouse in a daily delivery. This poultry may be packaged with protein film, and inside a container such as a cardboard box. Once the poultry is unpackaged for further processing, the boxes may be recycled, and the protein film may be bundled in bales. This may generate approximately two bales per day per delivery. A single 53 foot reefer trailer may hold about 20 to about 30 bales, or around 27 bales. The film bales are collected in the reefer, until it is substantially full, before delivering the bales to a treatment facility. Indeed, the truck may make a single delivery/trip to the treatment facility no more than about once a week, or up to about every 10 days to about every 30 days. Since the treatment facility is typically located at a substantial distance from the food processing facility, the collection of a large quantity film in a reefer trailer avoids the substantial transportation costs incurred in the daily delivery to the treatment facility. Additionally, treatment of the protein film at a remote facility instead of incineration at the factory provides clean recycled film and avoids environmental pollution.

In certain embodiments, the temperatures inside the reefer may be below about 2 degrees C., or at about 1.7 degrees C. or lower, or from about 1.1 degrees C. to about 1.7 degrees C. The cooling prevents the bales from rotting and enables them to be collected at the facility over a number of days or weeks. It should be appreciated that the specific temperature of the trucks, and frequency of delivery to the treatment facility may depend on factors such as the size of the truck, distance between the food processing facility and treatment facility, cooling costs, fuel costs, type of film, type of food contamination, degree of residual contamination, rate of bacterial growth, rate of production of the used film product, etc.

In some embodiments, the reefer trailer may have a roll up door. This effectively separates/isolates the truck from the facility (as the doors do not open directly into the facility), to maintain FDA/USDA compliance. Additionally, the roll up door permits the trailer to easily be closed after the bale(s) are loaded and when the truck is backed up into the plant and/or in a crowded facility. As such, once loaded onto the reefer unit, the bales may remain inside the unit and in effective isolation from the food processing facility.

Once delivered to the treatment facility, the bales may be sanitized and/or recycled via a treatment and/or reclamation process 200. In some embodiments, process 200 may comprise grinding the film (step 202) then washing the ground product in a high pH lye solution followed by a neutralizing bath (step 204). In further embodiments, the process may comprise removal of any non-plastic remnants (step 206) and densification (step 208) of the film product. In further embodiments, process 200 may further comprise extrusion of the film product (step 210), wherein the newly formed product may be repelletized.

In certain embodiments, grinding 202 may be proceeded by a step of shredding the baled film (201). In some embodiments, washing the ground film according to step 204 may include friction washing (203) and agitating (205) the ground product. In one embodiment, step 204 may comprise friction washing the ground product, then agitating the product in a float sink tank with a lye solution having a pH value of about 11 to 13 to get rid of any protein/carbon based residue, wherein some or all of these steps may be repeated as necessary. In certain embodiments, a hydrocyclone may be used for removal of any non-plastic remnants 206 and densification 208. In some embodiments, further friction washing and/or drying (step 209) may be performed prior to extrusion/repelletization 210. In some embodiments, process 200 may further comprise adding a deodorizing composition, which may be a powder to the film product (step 211), wherein the deodorizing composition may be formulated to remove any odor and provide the film with a pleasant smell as is known in the art. In certain embodiments, adding the deodorizing composition may be done before or during extrusion 210. In some embodiments, the deodorizing composition may be applied to the bales while stored in the reefer unit, i.e., at the food processing facility.

In one embodiment, the deodorizing composition may comprise an effective amount of an anti-fungal and/or anti-microbial agent. In certain embodiments, this agent may comprise a cAlkyl (C12-16) dimethyl benzyl ammonium chloride. The deodorizing composition may further comprise an effective amount of a surfactant. In embodiments, the surfactant may comprise C12-15 alcohols ethoxylate. The composition may further comprise an effective amount of a solvent. In some embodiments, the solvent may comprise dipropylene glycol methyl ether. The composition may further include an effective amount of a chelating agent. In embodiments, the chelating agent may comprise Tetrasodium EDTA. In certain embodiments, the deodorizing composition may be a fabric softener product, such as DOWNEY® brand fabric softener. It should be appreciated that the composition of the disclosed system may include other active or non-active components known in the art, including but not limited to carrier components, viscosity modifying agents, emollients, surfactants, solubilizing agents, preservatives, fragrance, stabilizing agents, pH adjustors, various solvents, solubilizing agents, etc. Additionally, other deodorizing compositions known in the art may be used without departing from the inventive concept.

It shall be appreciated that the above-described steps for method 100 may be performed in various orders, and that steps may be omitted and/or added in alternate embodiments.

According to an exemplary embodiment, treatment of baled protein film according to method 100, may comprise shredding then grinding the bales. This may be followed by friction washing the ground product, then agitating the product in a float sink tank with a lye solution having a pH value of about 13 to 14 to get rid of any protein/carbon-based residue. This may be followed by another friction wash, neutralizing rinse through a rinse tank, and again another friction wash. A further step of removal of any non-plastic remnants using a hydrocyclone may be applied, followed by friction washing, and drying. The deodorizing powder may then be added, and the product may be extruded to create a new product. This process may be used to create, for example, slip sheets, or other usable products from the recycled film, which may be repalletized.

The above-described method provides an effective system for handling used food packaging film and keeps food processing facilities FDA and USDA compliant. Although the disclosed method has been explained in relation to its preferred embodiment, it is to be understood that many other possible modifications and variations can be made without departing from the spirit and scope of the invention as hereinafter claimed.

The constituent elements or steps of the disclosed method and composition listed herein are intended to be exemplary only, and it is not intended that this list be used to limit the disclosed subject matter of the present application to just these elements. Persons having ordinary skill in the art relevant to the present disclosure may understand there to be equivalent elements that may be substituted within the present disclosure without changing the essential function or operation of the system. Terms such as 'approximate,' 'approximately,' 'about,' etc., as used herein indicate a deviation of within +/−10%. Relationships between the various elements of the invention as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A method for handling used packaging film in a food processing facility, the method comprising:
    storing the used packaging film in a refrigerated unit, at the food processing facility for at least 3 days, the used packaging film having been removed from a food item, the used packaging film further being contaminated with residue from the food item; and
    transporting the used packaging film to a treatment facility for treatment after storing for multiple days,
    wherein the used packaging film is contaminated with perishable food residue, and
    wherein the refrigerated unit retards pathogenic growth in the used packaging film.

2. The method of claim 1, wherein the refrigerated unit is mobile and is used to transport the film to the treatment facility.

3. The method of claim 2, wherein the refrigerated unit is a reefer trailer.

4. The method of claim 2, wherein the refrigerated unit includes a roll up door.

5. The method of claim 1, wherein the used packaging film is baled prior to storing in the refrigerated unit.

6. The method of claim 5, wherein multiple bales of the packaging film are stored within the refrigerated unit for at least 7 days, prior to delivering to the treatment facility.

7. The method of claim 1, wherein the used packaging film comprises plastic film, protein film, and/or LDPE film.

8. The method of claim 1, wherein the used packaging film has been used for packaging raw meat items, including poultry.

9. The method of claim 1, wherein a temperature of the refrigerated unit is no greater than about 2 degrees Celsius.

10. The method of claim 1, further comprising adding a deodorizing composition to the used packaging film.

11. The method of claim 10, wherein the deodorizing composition is added to the used packaging film while it is stored in the refrigerated unit.

12. The method of claim 10, wherein the deodorizing composition is added to the used packaging film during treatment.

13. The method of claim 10, wherein the deodorizing composition comprises:
    an anti-fungal and/or anti-microbial agent;
    a surfactant;
    a solvent; and
    a chelating agent.

14. The method of claim 13, wherein the anti-fungal and/or anti-microbial agent comprises cAlkyl (C12-16) dimethyl benzyl ammonium chloride; and wherein the surfactant comprises C12-15 alcohol ethoxylate.

15. The method of claim 1, wherein treatment of the used packaging film comprises reclamation of the used packaging film.

16. The method of claim 1, wherein treatment of the used packaging film comprises washing the used packaging film in a high pH solution, the high pH solution having a pH value of about 11 or greater.

17. The method of claim 16, wherein treatment of the used packaging film comprises grinding the used packaging film prior to washing in said high pH solution.

18. The method of claim 17, wherein treatment of the used packaging film further comprises extruding the used packaging film after washing in said high pH solution.

19. The method of claim 17, wherein treatment of the used packaging film further comprises removal of any foreign remnants from the ground film prior to extruding.

20. The method of claim 17, wherein treatment of the used packaging film further comprises densification of the ground film prior to extruding.

* * * * *